United States Patent [19]

Voege

[11] Patent Number: 5,457,915

[45] Date of Patent: Oct. 17, 1995

[54] TILE SAW SHIELD

[76] Inventor: Richard E. Voege, 2560 Jacob St., Hayward, Calif. 94541-3312

[21] Appl. No.: 6,368

[22] Filed: Jan. 19, 1993

[51] Int. Cl.⁶ .................................................. B24B 35/04
[52] U.S. Cl. .................... 451/455; 144/252 R; 451/451
[58] Field of Search .......................... 51/266, 267, 268, 51/272; 125/13.03, 11.22; 144/251 R, 251 B, 252 R

[56] References Cited

U.S. PATENT DOCUMENTS

| | | | |
|---|---|---|---|
| 2,491,957 | 12/1949 | Dilley | 160/351 |
| 2,714,926 | 8/1955 | Nichta | 160/191 |
| 2,766,561 | 10/1956 | Carlson . | |
| 2,867,064 | 1/1959 | Hermansson | 51/272 |
| 3,183,629 | 5/1965 | Ver Mealen | 51/135 |
| 3,824,890 | 6/1972 | Zettler et al. | 90/11 R |
| 4,077,161 | 3/1978 | Wyle et al. | 51/98 R |
| 4,423,568 | 1/1984 | Gould | 51/272 |
| 4,484,845 | 11/1984 | Pennella, Jr. et al. | 51/272 |
| 4,578,907 | 4/1986 | Cayley et al. | 51/268 |
| 4,811,527 | 3/1989 | Ruopsa | 51/270 |
| 4,910,925 | 3/1990 | Longuet | 51/272 |

Primary Examiner—Bruce M. Kisliuk
Assistant Examiner—Eileen P. Morgan

[57] ABSTRACT

A transparent plastic shield for a tile saw includes four dismantable panels, two vertical side panels, a back panel and a top panel. The components are quickly assembled together via slotted edges or connecting extrusions and when dismantled stack flatly within the water tray which is included as part of the tile saw apparatus. The tile saw shield is configured to allow normal use of the tile saw, without encumbering the user. It contains water from spraying out of the tray, to the extent that the tile saw can be used in an interior setting.

17 Claims, 3 Drawing Sheets

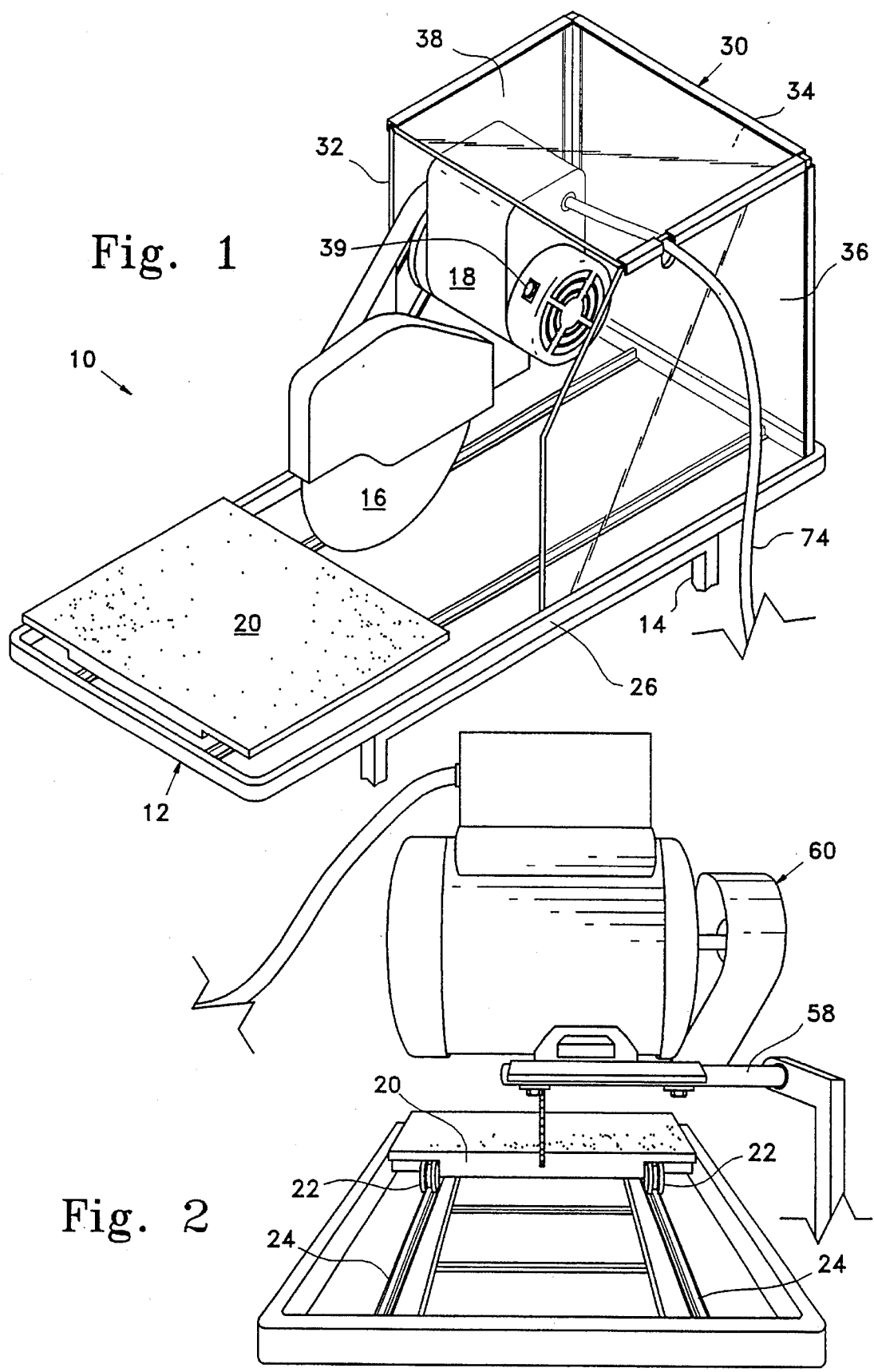

5,457,915

1

TILE SAW SHIELD

BACKGROUND OF THE INVENTION

The invention relates to tile saws, and more specifically the invention is concerned with a containment device for the spray of water from a tile saw, which normally prevents the saw equipment from being used in the interior of an interior setting.

Shields of various types have been well known, for a number of items of power equipment. For example, see U.S. Pat. Nos. 4,910,925, 4,811,527, 4,578,907, 4,077,161, 3,824,890, 3,183,629, 2,867,064, 2,766,561, 2,714,926 and 2,491,957.

Of the above patents, Ver Meullen Patent No. 3,183,629 discloses a shield structure comprised of wall s which are removable, the shield being applied to a belt grinder. Hermansson Patent No. 2,867,064 discloses a splash guard involving a movable transparent panel. The splash guard is designed for machine tools and does not encompass the features and advantages of the present invention.

None of the above referenced patents shows a collapsible transparent tile saw shield having the features of the present invention described below. Moreover, nothing in the prior art shows a splash guard or shield for a tile saw, enabling the tile saw to be used indoors without damage to surrounding furniture, floors, etc.

SUMMARY OF THE INVENTION

In accordance with the present invention, a shield for a tile saw includes a plurality of panels, preferably transparent, which are assembled to rest within the tray of the tile saw. Typically a tile saw includes a water-containment tray with a shallow peripheral rim or wall. Left side, right side and back panels of the tile saw shield rest in the tray, just inside the peripheral lip, and are retained together by suitable edge securement means. A top panel completes the assembly, again being connected to the other three panels by an appropriate edge attachment. Thus, the four panels of the tile saw shield are easily erected and quickly dismantable. When dismantled, the panels stack flatly and compactly within the water tray of the tile saw apparatus, from which the motor/ saw blade assembly is typically removed for transport. Thus, the panels are contained in a component which would otherwise be empty.

The erected shield of the invention effectively contains water from spraying out of the tray during use, to the extent that the tile saw apparatus can be used in an interior setting. Thus, an operator, when on a job such as an apartment above the ground floor, is not required to travel back and forth to an outdoor location of the tile saw, as is often required in conventional practice. The invention also allows work to continue in bad weather.

The tile saw shield is configured to allow normal use of the tile saw, without encumbering the user or the range of motion of the tile saw's tile cutting platform. The only exception is that the shield does not allow 12 inch tile to be cut because it prevents tile from hanging out over the tray's side edges. However, 12 inch tile will drip water on the floor and should be cut outdoors in any event, so that no real limitation is imposed.

Accordingly, in one embodiment the Dresent invention comprises a shield apparatus for a tile saw which has a tray

2 carrying a liquid bath and having a motor driven cutting blade over which the liquid passes, the shield being positioned to substantially prevent liquid from spraying or splashing out from the tile saw and beyond the tray. The shield includes a plurality of portable panels, with a back panel, left and right side panels and a top panel. These panels include connection means for retaining adjacent edges of the panels together in a generally rectangular arrangement of the panels, cooperating with the location of the panels just inside the lip or peripheral wall of the tray to retain the shield in place in the tray. The panel connection means include means for quickly erecting and quickly disconnecting the panels from each other. Further, each panel is of a size and shape such as to readily stack and fit flatly in the tray when disconnected from the other panels, for compact storage and transport.

In a preferred embodiment, all of the panels are of substantially transparent plastic material. They may be of acrylic material, such as the acrylics sold under the trademarks Lucite and Plexiglas. They may also be of polycarbonate material (as sold under the trademark Lexan, or any other transparent material having similar properties, preferably with some scratch resistance.

In one specific embodiment of the invention, the panel connection means comprises grooves formed adjacent to the edges of some of the panels, for receiving the edge of an adjacent panel in generally rectangular orthogonal relationship. Another preferred panel connection means is the use of extruded strips having two channels at right angles, for receiving edges of the panels. Preferably the side and top panels are of sizes to extend not to the front of the tray, but leaving space for an operator to conveniently operate the tile saw. For some configurations of tile saw, at least one of the side panels may be required to include a cut out area to accommodate support structure or other tile saw structure.

Hinging could alternatively be used for some of the connections (three maximum), with appropriate edge connection used for the remaining edge connections. The hinges (not shown) must be positioned and configured so as to allow the panels, when broken apart, to stack relatively flatly.

It is therefore among the objects of the invention to provide a conveniently usable, quickly erectable and dismantable shield apparatus for use with a tile saw, with the dismantled shield comprising separate panels which can be stored in the water tray of the tile saw apparatus itself. These and other objects, advantages and features of the invention will be apparent from the following description of a preferred embodiment, considered along with the accompanying drawings.

DESCRIPTION OF THE DRAWINGS

FIG. 1 is a perspective view showing a tile saw apparatus fitted with a tile saw shield according to the invention.

FIG. 2 is a rear elevation view of a tile saw apparatus, without the shield.

DESCRIPTION OF PREFERRED EMBODIMENTS

Figure 5:
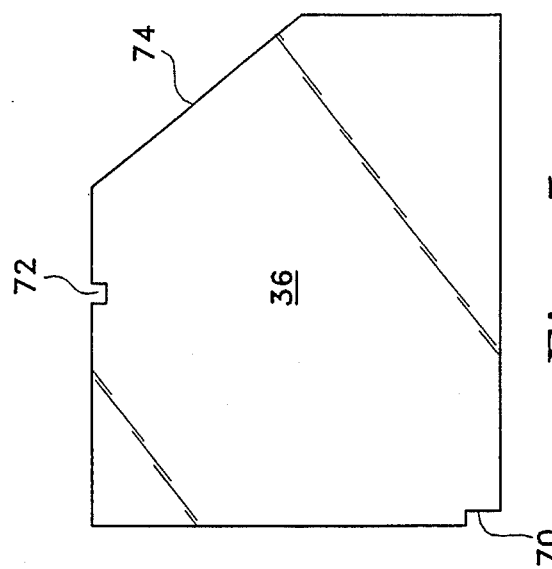
FIG. 3, 4, 5 and 6 are plan views showing unassembled left, rear, right and top panels in accordance with one embodiment of the tile saw shield, for a specific type of tile saw, all panels being viewed at their inside surfaces.

FIG. 1 shows a conventional tile saw apparatus generally identified as 10, with a liquid bath tray 12, a support stand or frame 14, a bearing-mounted tile saw blade 16, driven by a motor 18, and a movable carriage or stage 20 which is slidable forward and back under the blade 16 to cut tiles. As shown in FIG. 2, the movable stage 20 has rollers 22 which ride on tracks or rails 24, one on each side of the tray 12. The tracks 24 form an integral or permanently fixed part of the tray 12 in a conventional tile saw.

To use the tile saw apparatus 10, the operator places a tile, such as a ceramic tile, on the slidable stage 20, with the stage in a forward position relative to the saw blade 16, i.e. a position nearer the operator. With the saw blade rotating, the stage is pushed toward the back of the apparatus so that the tile is cut by the diamond-tipped saw blade, in a line parallel to the carriage tracks 24. The purpose of the tray 12, which has a lip or wall 26 around its perimeter, is to carry a bath of liquid (preferably water) which is constantly fed against the blade for cooling and lubrication as the cutting progresses. The feeding of the water to the blade is accomplished by a small electric pump (not shown) which draws water from the bath and delivers it via a tube (not shown) against the blade so that the cutting edge of the blade is always wet during the cutting operation.

FIG. 1 also shows a tile saw shield of the invention, generally identified as 30, secured in place on the tile saw apparatus 10. The illustrated tile saw 10 is of one specific type in common use, i.e. a Tile Master Model TM-1 tile saw manufactured by Felker Operations division of Federal-Mogul Corporation. Patent No. 3,635,206 describes the slidable water tray of such a tile saw. However, the principles of the invention apply to tile saws in several different typical configurations.

Figure 7:
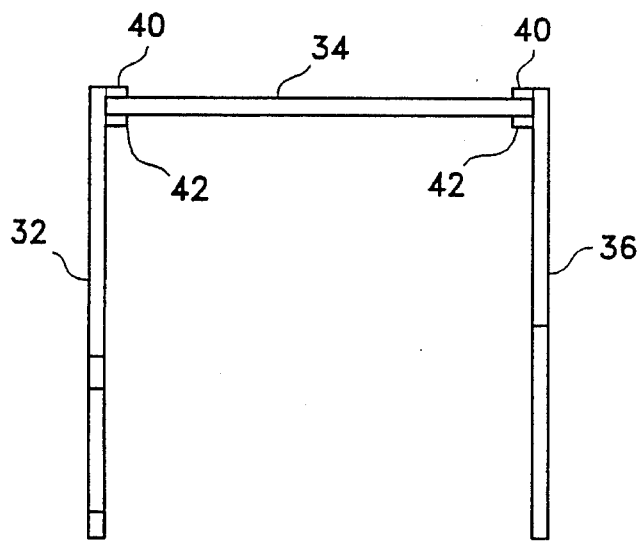
FIG. 7 is a top plan view schematically showing one form of edge assembly which may be used to retain the panels together.

As illustrated, the tile saw shield includes a left side panel 32, a back panel 34, a right side panel 36 and a top panel 38. The top panel 38 is shorter in length or depth than the side panels, extending approximately to the front of the motor 18, to allow easy access to a power switch 39 typically mounted at the front of the motor. These panels rest in the tray 12, lust inside the lip or wall 26 of the tray as shown in FIG. 1. The four panels 32–38 preferably are of transparent plastic material which may be acrylic sheet material, polycarbonate or other material as noted above, and are secured together by their edges. Any suitable means of quick, efficient securement may be employed, one connection system being indicated in FIG. 7. As shown in FIG. 7, some of the panels may have a slotted arrangement at their edges, to receive an adjacent panel. Thus, the left side panel 32 may include at its back edge a pair of adjacent but spaced apart flanges 40 and 42, forming a vertical channel or slot into which the left edge of the back panel 42 is inserted and fairly closely fitted. Similarly, the back edge of the right panel 36 may include a pair of channel-forming flanges 40 and 42, forming a vertical channel or slot which faces to the left for receiving the right edge of the back panel 34 as illustrated. Alternatively, the back panel 34 could simply have forwardly-facing flanges 40 and 42 at each side, both facing forward, for receiving non-flanged edges of both the left and right side panels 32 and 36, but the FIG. 7 arrangement is preferred to restrain the side panels from pulling forward.

In FIG. 7 the top panel 38 is not shown. That panel may include similar flanges as in FIG. 7 to form channels for engaging over the top edges of the left, rear and right panels 32, 34 and 36 when placed thereon. These flanges may terminate short of the back left and right corners, so that they do not interfere with the vertically oriented flanges 40 and 42 on the rear panel 34 and/or the side panel 32 or 36. Alternatively, the flanges 40 and 42 of the rear or side panels could be truncated to less than full height to avoid flange to flange interference.

The channels formed by these flanges provide for quick erection and dismantling of the tile saw shield.

The channel-forming flanges 40 and 42 can simply comprise linear acrylic moldings secured to the surfaces of the flat panels, as by solvent bonding.

Figure 9:
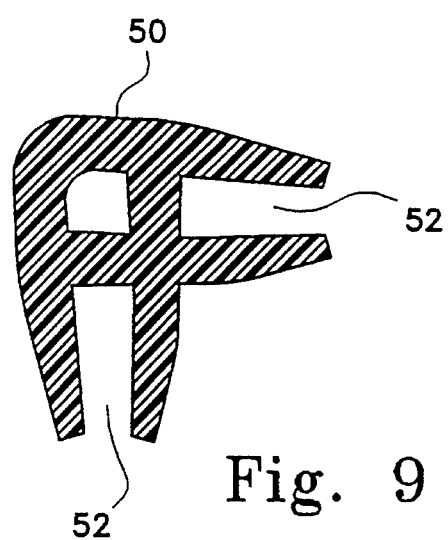
FIG. 9 is a sectional view showing an extrusion which may be used to secure the shield panels edge-to-edge, as an alternative to the configuration shown in FIG. 7.

As another preferred form of panel connection, an extrusion 50 such as shown in FIG. 9 can be used for holding the panels together at their edges. Such an extrusion 50, formed of relatively hard plastic or of a rubbery plastic material and having channels 52 at right angles, is engaged onto the edges of certain panels, such as the top panel and the back edges of the left and right side panels, preferably permanently as by solvent bonding. The extrusions are then engaged over the adjacent panel edge as the tile saw shield is assembled. Five lengths or strips of the extrusion are used for the assembly shown. The extrusion 50 allows quick dismantling of the tile saw shield assembly, with each strip preferably remaining on one or the other of the adjacent panel edges.

In another embodiment of edge connection (not shown), some of the panels may simply have a right angle bend at an edge for engagement over an adjacent panel edge. Three edges of the top panel can be angled. The resulting assembly, however, tends to be less stable than the assemblies described above.

As noted above, some of the panels could alternately be hinged together at edges (not shown). The hinges can simply be bendable plastic hinges, continuous through the length of an edge. They can be applied, for example, at side to back panel connections. The top panel could also be hinged from one of the other panels. Hinging is limited by the ability to insert panels around saw structure, and may be more appropriate for saws other than the type illustrated.

Figure 6:
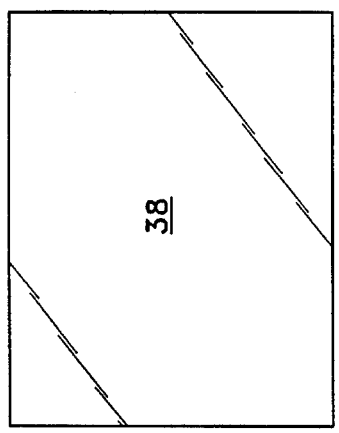
Figure 8:
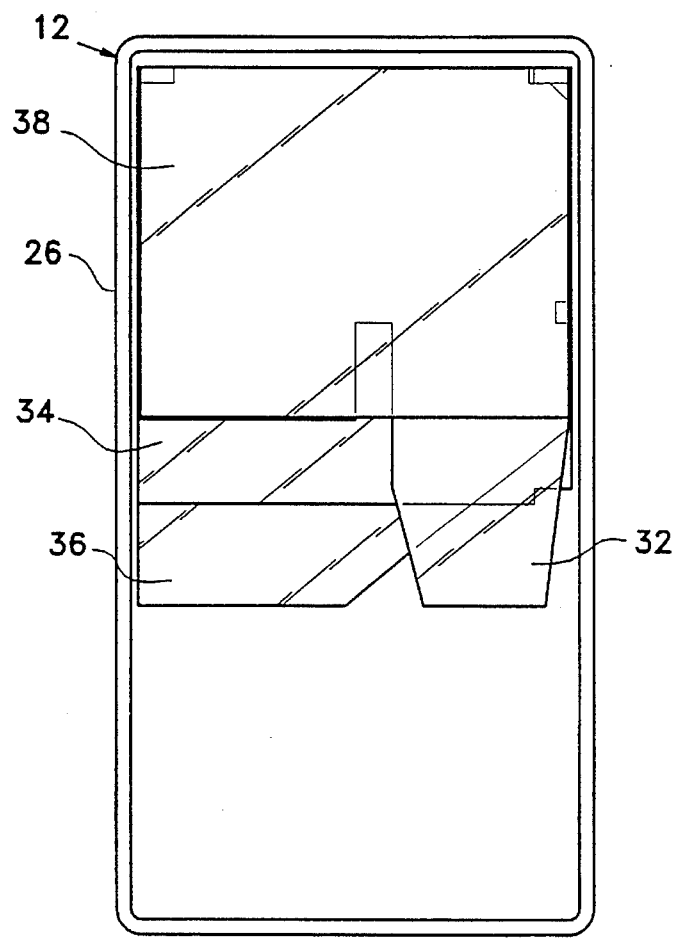
FIG. 8 is a top plan view showing a tray of the tile saw apparatus, with the disassembled shield panels stacked in the tray.

FIG. 8 illustrates, somewhat schematically, an important feature of the invention. All of the four shield panels 32–36 are dimensioned so as to fit within the confines of the perimeter lip or wall 26 of the liquid containing tray 12. The panels are shown stacked in the tray in FIG. 8, with the motor/blade assembly removed (this and other types of tile saw provide for lifting the tray off the frame, and separation of the motor/blade assembly from the frame). The height of the tile saw shield, i.e. the side and back panels, is such that all three of these panels fit between the lips 26 at left and right of the liquid tray. The top panel 38 may have a width sufficiently narrow to fit within the tray, depending on the type of edge securement used, but in any event its length is preferably less than its width, as shown in FIG. 6, so that it can easily be turned at right angles to its erected position for stacking in the tray. With the four panels stacked in the tray, the shield is easily and compactly stored and transported along with the saw apparatus, requiring no additional bulk and little additional weight.

Figure 4:
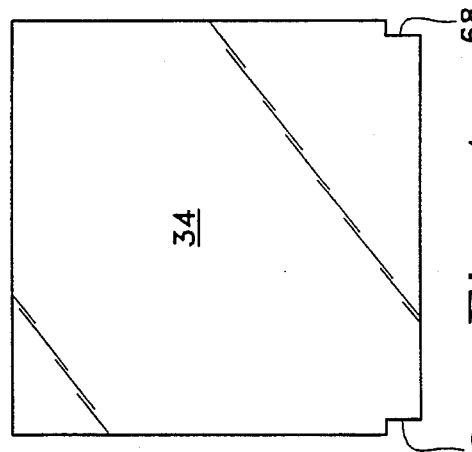
Figure 3:
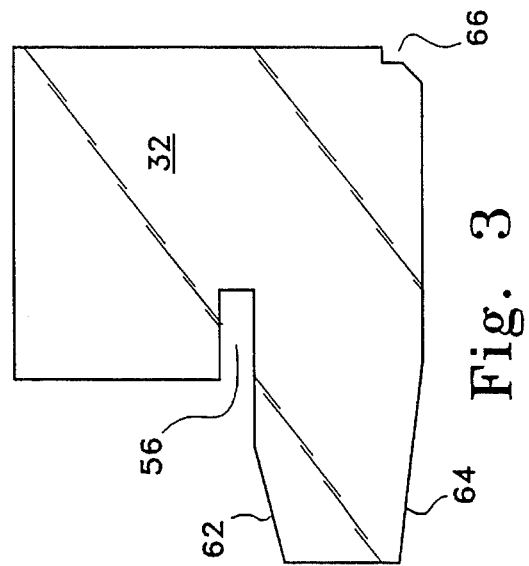

As indicated in FIG. 3, 4 and 5, the side and back panels may be somewhat irregular in shape, to accommodate various features of the liquid bath tray or of other structural features of the tile saw. For example, the left side panel 32 fits inside surface is shown in FIG. 3) may include a slot 56 for accommodating a structural support bar 58 which supports the motor and blade assembly 60, as seen in FIG. 2. Also, edges at 62 and 64 may be slightly angled, to allow this panel to be inserted under the support bar 58, which requires an initial tilt to permit the insertion. Also, FIGS. 3–5 show rear corner cut outs 66, 68 and 70 at the bottom corners of the side and back panels. These are to accommodate the shape of the liquid bath tray 12, which, as shown in FIG. 8, typically has a radius at each corner. Further, a notch 72 may need to be provided at the top edge of one of the panels, such as the right side panel 36 shown in FIG. 5, to accommodate an electrical cord 74 (FIG. 1) extending from the motor. All interior corners of notches and cutouts preferably have a small radius. The right panel 36 is shown with an angled edge 74, simply because it extends farther to the bottom than at the top panel. This and other edges could be curved rather than straight.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. In combination with a tile saw having a tray with Upwardly extending peripheral walls or lips, the tray carrying a liquid bath and the tile saw including a motor driven cutting blade over which the liquid passes and a movable stage on rollers facilitating movement of the stage by an operator toward and under the cutting blade to cut a tile carried on the stage, a tile saw shield positioned to substantially prevent liquid from spraying or splashing out from the tile saw and beyond the tray, comprising:

a plurality of portable panels, including a back panel, left and right side panels and a top panel, panel connection means for retaining adjacent edges of the panels together in a generally rectangular arrangement of the panels with the side and back panels generally vertical, the panel connection means including means for quickly dismantling the rectangular arrangement of panels, means for retaining the side and back panels in the tray at generally peripheral locations in the tray, and each panel being substantially planar and of a size and shape such as to stack and fit flatly in the tray when disconnected from the other panels, for compact storage and transport.

2. The tile saw apparatus of claim 1, wherein the panels are of substantially transparent plastic material.

3. The tile saw apparatus of claim 2, wherein the panels are of acrylic material.

4. The tile saw apparatus of claim 1, wherein the panel connection means comprises grooves formed adjacent to the edges of some of the panels, for receiving the edge of an adjacent panel in generally perpendicular relationship.

5. The tile saw apparatus of claim 1, wherein the panel connection means comprises extruded edge gripping strips, each having two slots or channels oriented at right angles to one another so as to receive a pair of adjacent panels oriented at right angles to each other.

6. The tile saw apparatus of claim 5, wherein each edge gripping strip is permanently secured to an edge of one of the panels.

7. The tile saw apparatus of claim 1, wherein the side and top panels are of sizes to extend less than to the front of the tray, leaving space for an operator to conveniently operate the tile saw.

8. The tile saw apparatus of claim 1, wherein the means for retaining the side and back panels in the tray comprises the sizing and positioning of the side and back panels such that bottom edges of the side and back panels rest in the tray just inside upwardly extending walls or lips of the tray.

9. The tile saw apparatus of claim 1, wherein the top panel extends to a position substantially covering the motor of the tile saw and approximately to the position of the back edge of the cutting blade.

10. The tile saw apparatus of claim 1, wherein one of the side panels is generally rectangular but with an obliquely angled truncation at an upper corner near the user, so that the top edge of said one side panel generally matches the length of the top panel, and the lower part of said one side panel extends farther toward the front of the tray.

11. In combination with a tile saw having a tray with upwardly extending peripheral walls or lips, the tray carrying a liquid bath and the tile saw including a motor driven cutting blade over which the liquid passes as fed by a pump and a movable stage on rollers facilitating movement of the stage by an operator toward and under the cutting blade to cut a tile carried on the stage, a tile saw shield positioned to substantially prevent liquid from spraying or splashing out from the tile saw and beyond the tray, comprising:

a series of panels, including a back panel to be positioned behind the saw, left and right side panels and a top panel, panel connection means for connecting adjacent edges of the panels together, without fasteners, when the panels are positioned in a generally rectangular arrangement with the side and back panels generally vertical and with the top panel having three edges closely adjacent to top edges of the side and back panels, the side and back panels being of such size that bottom edges of the side and back panels rest in the tray just inside the upwardly extending walls or lips of the tray when the panels are positioned together in the generally rectangular arrangement, means associated with the panel connection means for quickly dismantling the generally rectangular arrangement of the panels so as to permit stacking of the panels together, and each panel being substantially planar and of a size and shape such as to fit generally flatly in the tray when the panels are stacked together, for compact storage and transport.

12. The tile saw apparatus of claim 11, wherein the panel connection means comprises a channel means fixed to edges of some of the panels, for receiving the edge of an adjacent panel in generally perpendicular relationship.

13. The tile saw apparatus of claim 12, wherein the channel means comprises extruded edge gripping strips, each having two slots or panels oriented at right angles to one another so as to receive a pair of adjacent panels oriented at right angles to each other.

14. In combination with a tile saw having a tray with upwardly extending peripheral walls or lips, the tray carrying a liquid bath and the tile saw including a motor driven cutting blade over which the liquid passes as fed by a pump and a movable stage on rollers facilitating movement of the stage by an operator toward and under the cutting blade to cut a tile carried on the stage, a tile saw shield positioned to substantially prevent liquid from spraying or splashing out from the tile saw and beyond the tray, comprising:

a series of panels, including a back panel to be positioned behind the saw, and left and right side panels, panel connection means for connecting adjacent edges of the panels together without fasteners when the panels are positioned in a generally rectangular arrangement with the side and back panels generally vertical and defining generally an enclosure open at its front where the movable stage moves in and out, the side and back panels being of such size that bottom edges of the side and back panels rest in the tray just inside the upwardly extending walls or lips of the tray when the panels are positioned together in the generally rectangular arrangement, and means associated with the panel connection means for quickly dismantling the generally rectangular arrangement of the panels so as to permit stacking of the panels together.

15. The tile saw apparatus of claim 14, wherein the panel connection means comprises grooves formed adjacent to the edges of some of the panels, for receiving the edge of an adjacent panel in generally perpendicular relationship.

16. The tile saw apparatus of claim 14, wherein the panel connection means comprises extruded edge gripping strips, each having two slots or channels oriented at right angles to one another so as to receive a pair of adjacent panels oriented at right angles to each other.

17. The tile saw apparatus of claim 16, wherein each edge gripping strip is permanently secured to an edge of one of the panels.

* * * * *